US010652254B2

United States Patent
Kuperman et al.

(10) Patent No.: US 10,652,254 B2
(45) Date of Patent: May 12, 2020

(54) ANALYZING WEB APPLICATION BEHAVIOR TO DETECT MALICIOUS REQUESTS

(71) Applicant: Zenedge, Inc., Los Angeles, CA (US)

(72) Inventors: Leon Kuperman, Tarzana, CA (US); Kipras Mancevicius, Kaunas (LT)

(73) Assignee: ZENEDGE, INC., Aventura, FL (US)

( * ) Notice: Subject to any disclaimer, the term of this patent is extended or adjusted under 35 U.S.C. 154(b) by 281 days.

(21) Appl. No.: 15/441,169

(22) Filed: Feb. 23, 2017

(65) Prior Publication Data

US 2017/0244737 A1  Aug. 24, 2017

Related U.S. Application Data

(60) Provisional application No. 62/298,985, filed on Feb. 23, 2016.

(51) Int. Cl.
*H04L 29/06* (2006.01)
*G06N 3/04* (2006.01)
*G06N 3/08* (2006.01)

(52) U.S. Cl.
CPC ........... *H04L 63/1425* (2013.01); *G06N 3/04* (2013.01); *G06N 3/084* (2013.01); *H04L 63/0227* (2013.01); *H04L 63/1416* (2013.01); *G06N 3/0427* (2013.01); *H04L 63/101* (2013.01)

(58) Field of Classification Search
CPC .................................................. H04L 63/1425
USPC .......................................................... 726/12
See application file for complete search history.

(56) References Cited

U.S. PATENT DOCUMENTS

| 8,549,645 B2* | 10/2013 | Tang ..................... G06F 21/552 726/22 |
| 9,081,961 B2* | 7/2015 | Yermakov ........... H04L 63/0227 |
| 9,407,660 B2 | 8/2016 | Yu |
| 9,473,530 B2 | 10/2016 | Bhogavilli et al. |
| 9,491,187 B2* | 11/2016 | Sridhara ............. H04L 63/1408 |
| 2006/0059550 A1* | 3/2006 | Kausik ................. G06Q 20/027 726/11 |
| 2007/0136590 A1* | 6/2007 | Nah ...................... H04W 12/04 713/171 |

(Continued)

*Primary Examiner* — Teshome Hailu
(74) *Attorney, Agent, or Firm* — Kraguljac Law Group, LLC

(57) ABSTRACT

A system is configured for protecting web applications at a host by analyzing web application behavior to detect malicious client requests. Example embodiments described herein include a proxy configured to handle network traffic between a host and clients. The proxy includes two request classification mechanisms, first a list of known clients, malicious and non-malicious, for identifying known malicious and known non-malicious requests and second a web application firewall for determining a classification for unknown requests (e.g., not originating from a known client). The classification itself may be distributed. The proxy determines whether a request is known non-malicious, known malicious, or unknown. The proxy collects request attributes for the known malicious and known non-malicious requests for the generation of a model based on the attributes of the known requests. The proxy passes the unknown requests to the WAF for determining a classification based on their attributes using the model.

19 Claims, 8 Drawing Sheets

(56) References Cited

U.S. PATENT DOCUMENTS

| | | | |
|---|---|---|---|
| 2012/0227105 A1* | 9/2012 | Friedrichs | G06F 21/564 726/22 |
| 2013/0014253 A1* | 1/2013 | Neou | H04L 63/1441 726/22 |
| 2014/0096194 A1* | 4/2014 | Bhogavilli | H04L 63/0236 726/3 |
| 2015/0363791 A1* | 12/2015 | Raz | G06Q 30/0185 705/318 |
| 2017/0222979 A1 | 8/2017 | Kuperman et al. | |
| 2017/0223049 A1 | 8/2017 | Kuperman et al. | |

* cited by examiner

FIG. 7A

ANALYZING WEB APPLICATION BEHAVIOR TO DETECT MALICIOUS REQUESTS

CROSS REFERENCE TO RELATED APPLICATIONS

This application claims the benefit of U.S. Provisional Application No. 62/298,985, filed Feb. 23, 2016, which is incorporated by reference herein in its entirety.

This application is related to U.S. application Ser. No. 15/418,518 and U.S. application Ser. No. 15/418,527, both of which are incorporated by reference herein in their entirety.

TECHNICAL FIELD

The disclosure generally relates to protecting web applications at a host that are accessible by a client, and more specifically, to analyzing web application behavior to detect malicious client requests.

BACKGROUND

Internet enabled clients, such as smart phones, personal computers, tablets, gaming systems and the like have become prevalent in recent years. Given the proliferation of Internet enabled clients and far-reaching Internet access, more and more users access online content hosted by servers. The vast majority of users access online content from hosts for legitimate reasons. However, there are illegitimate users who try to take down the hosts of online content with malicious clients, whether to simply deny services to other users or for more nefarious purposes.

An example of online content is web applications, which are made available for clients to access by a host. Web applications have become a popular method for providing online functionality to clients. Hundreds of thousands of web applications have been deployed and many more are offered to provide new functionality to clients over a network. Many of these web applications have vulnerabilities, which may be exploited to varying degrees by malicious clients. For example, a malicious client may exploit a vulnerability of a web application to bring down the web application/host, or worse yet, breach an organization, obtain valuable information, and utilize or expose the information for nefarious purposes. Given the ubiquity of web applications, they often provide an easy entry point for hackers to exploit with a malicious client and set a foothold within a target organization via the host of the web application to obtain valuable information.

Traditional methods of protecting web applications comprise a web application firewall (WAF). One well-known example of a WAF is MOD SECURITY, an open source project that has its roots as an Apache Webserver module. Many other commercially available WAFs exist as well. WAFs can be categorized as follows: Negative Security Model (signature based), Positive Security Model (signature based), and Profiling/Anomaly Detection (unsupervised).

A common issue with traditional signature based WAFs is that they are difficult to deploy and maintain to stay current with existing and emerging threats. While deploying a WAF with a basic rule set provides some level of protection, there are very well documented methods for evading traditional, signature based WAFs. In many cases, signature based WAFs are also not adequately tuned due to the lack of skilled operators available. Further, as signature based WAF implementations grow in complexity with the number of rules implemented, a web application behind the WAF will often experience performance issues. This occurs because negative and positive security models are based on signatures that are written as regular expressions (e.g., Regex's), that are computationally expensive and have to be executed for every HTTP(s) request seen by the host in order to filter traffic.

Profiling/anomaly detection WAFs attempt to learn patterns in web application traffic by passively inspecting HTTP(s) requests to determine malicious behavior. A profile is built based on either static source code analysis or probing of the web application in a staging environment. During deployment, requests are checked against the profile and backend database access to identify whether they are attempting to exploit a known vulnerability. A major drawback of this approach is that profiles extend poorly to general and new attack types, as they only capture attacks on specific known vulnerabilities, such as SQL Injection, for example. Accordingly, profiling/anomaly detection WAFs often require an inordinate amount of time to determine which behaviors are malicious unless the behavior meets specific criteria.

Additionally, and more generally, traditional WAFs are ineffective at providing a good balance between user experience and web application protection as they generate far too many false positives. A false positive is the miss categorization of a non-malicious client and/or behavior as malicious. From a user experience perspective, the miss categorization of the user's client or behavior as malicious negatively impacts the user's experience when engaging the web application (e.g., access is restricted and/or must pass CAPTCHAs and other challenges). In terms of web application protection, a high number of false positives results in a noisy alerting system that an administrator must constantly monitor to rectify false positives in order to avoid blockage of legitimate user traffic. Further, given the lack of skilled operators, a high number of false positives in a noisy alert system increases difficulty on administrators to distinguish between legitimate and non-legitimate traffic.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

Figure (FIG. 1 illustrates a block diagram of an example communications environment for exploiting a web application, according to one example embodiment.

FIG. 7A and FIG. 7B illustrate example interfaces for reviewing requests, according to an example embodiment.

DETAILED DESCRIPTION

Figure 1:
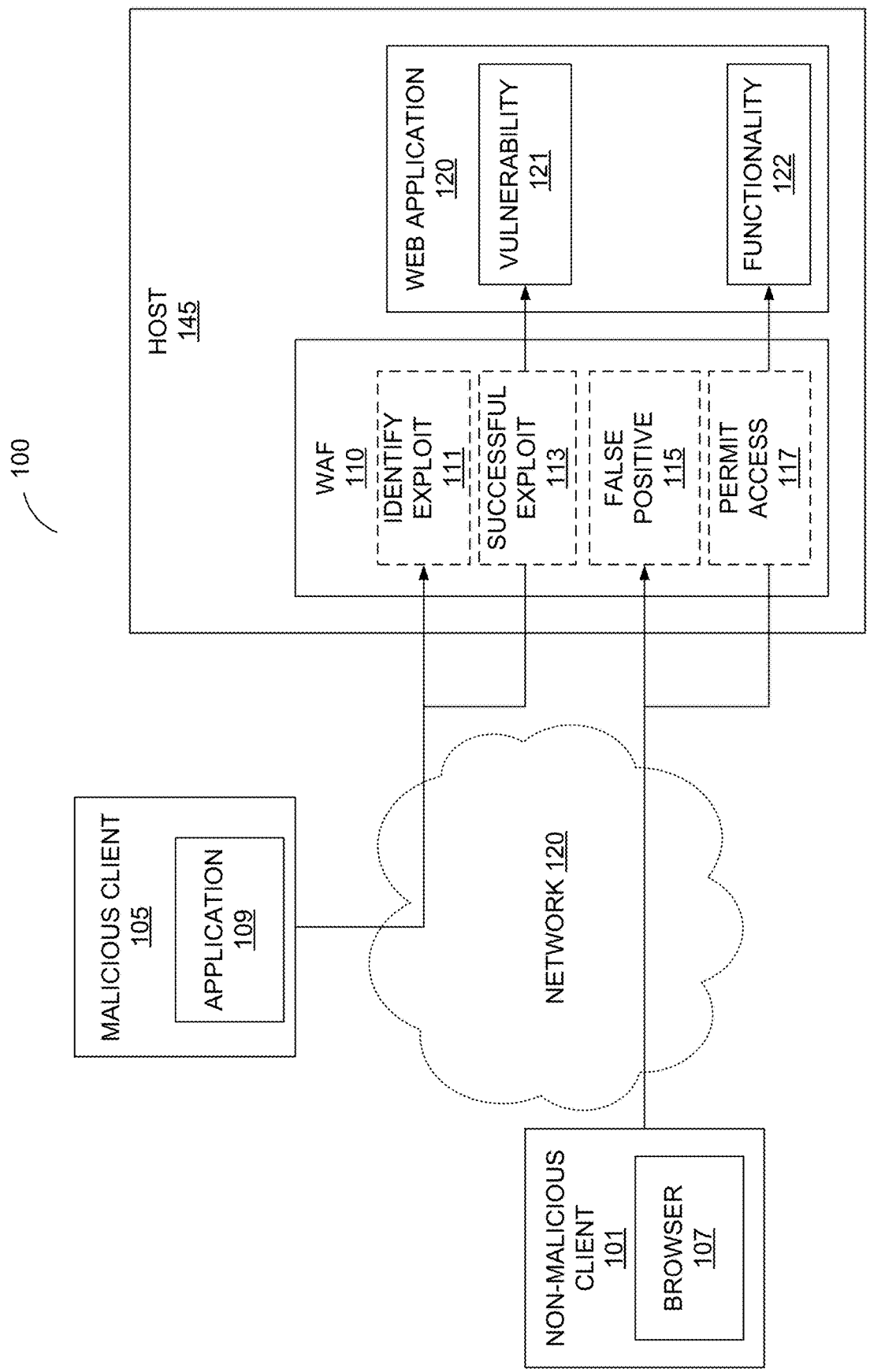

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A system (and method, and computer readable storage medium storing computer program instructions) is configured for protecting web applications at a host by analyzing web application behavior to detect malicious client requests. Example embodiments described herein include one or more proxy devices (proxy or proxies), such as a hypertext transfer protocol/secured hypertext transferred protocol (HTTP/HTTPS "HTTP(S)) proxy server, configured to handle network traffic between a one or more client devices (client or clients) and one or more host devices (host or hosts). The clients and host are computing systems (or machines), for example, as shown and described with FIG. 4. Clients engage the host through the proxy to access the functionality of a web application. For example, the proxy may receive a request from a client for functionality of the web application hosted on the host server.

The proxy may include two classification mechanisms. A first classification mechanism may be a list of known clients, malicious and non-malicious, for identifying known malicious and known non-malicious requests. A second classification mechanism may be a web application firewall (WAF) for determining a classification for unknown requests (e.g., requests not originating from a known client). In response to receiving a request, the proxy determines whether a request is known non-malicious, known malicious, or unknown. The proxy may collect request attributes for the known malicious and known non-malicious requests for the generation of a model based on the attributes of the known requests. In some example embodiments, the proxy may generate the model based on the attributes of the known requests. In other example embodiments, the proxy may transmit the collected known requests to a log collector, which collects known requests from the proxy for distributed model generation. In some embodiments, the log collector may collect known requests from the proxy and one or more additional proxies.

The proxy passes the unknown requests to the WAF for determining a classification based on their attributes. In some example embodiments, the WAF includes the model based on the attributes of the known requests for determining the classification for an unknown request. In other example embodiments, the WAF queries a prediction service with the attribute of an unknown request for determining the classification and receives the classification for the unknown request from the prediction service. In response to a classification of the request as non-malicious, the WAF permits the client that originated the request access to the functionality of the web application at the host. In response to a classification of the request malicious, the WAF denies the client that originated the request access to the functionality of the web application at the host.

Model generation based on the known requests takes into account the attributes of the requests. The known requests are separated into collections of known non-malicious and known malicious requests. In some embodiments, a vector is determined for each known request. The request vector is a vector of the attributes of the request, and one or more individual attributes may be represented by an attribute vector. The known malicious collection of request vectors and known non-malicious collection of request vectors are processed to generate a model for classifying unknown requests based on their attributes. For example, an unknown request may be vectorized and input through the model which may classify the request as malicious or non-malicious.

The proxy may challenge a client requesting web application functionality and determine a challenge PASS/FAIL indication for the client. The proxy may also fingerprint a client requesting web application functionality and determine a fingerprint presented YES/NO indication for a request in addition to the fingerprint. The proxy may preprocess a received request with a traditional WAF to determine traditional WAF rule failures (if any). The proxy may provide one or more of these determinations and data as request attributes for known requests for model generation and/or unknown requests for classification by a model.

Exploiting WAFs

Turning now to Figure (FIG. 1, it illustrates a block diagram of an example communications environment 100 for exploiting a web application 120 at a host 145, according to one example embodiment. The environment 100 may include one or more client devices 101, 105 and a host 145. The clients 101, 105 and host 145 may communicate via a network 120.

The network 120 may be a communication network that transmits data between one or more of the client devices 101, 105 and host 145. In one example embodiment, the network 120 is the Internet. While only one network 120 is shown, nefarious entities such as malicious clients 105 (although only one is shown) may communicate and/or be controlled by an overlay network (e.g., a darknet) and/or auxiliary network using specific software, non-standard protocols, etc. for one or more of their communications. For example, the malicious client 105 may be a constituent client of a botnet comprising many malicious clients whose activities may be controlled, at least in part, by a control server managing the botnet. Example embodiments may include many hosts 145, non-malicious clients 101 and malicious clients 105.

In one example embodiment the network 120 may include wireless network and/or wired network. In one embodiment, the network 120 uses standard communications technologies and/or protocols. Thus, the network 120 may enable communications using, for example, technologies such as Ethernet, 802.11, integrated services digital network (ISDN), digital subscriber line (DSL), asynchronous transfer mode (ATM), etc. Similarly, the networking protocols used on the network 120 can include, for example, the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), Java Script (Java), Asynchronous Java Script (AJAX), the extensible markup language (XML), etc. In addition, all or some of links can be encrypted using conventional encryption technologies such as the secure sockets layer (SSL), Secure HTTP (HTTPS) and/or virtual private networks (VPNs). In another example embodiment, the entities may use custom and/or dedicated data communications technologies instead of, or in addition to, the ones described above. For example, nefarious entities can also utilize a network 120 of dedicated or private communications links that are not necessarily part of the Internet but may overlay and utilize one or more network 120 components. In another example, clients may utilize provided network access points such as by an Internet Service Provider or Cellular Provider (Service Provider) to transmit and receive data over the 120 network. Thus, a service provider may implement and manage a wireless or wired access point and associated infrastructure to provide client devices or users of the client devices access to the network 120 through a paid service.

In one example embodiment, a client, e.g., 101, 105, is a computing device with network capabilities for transmitting and receiving data packets over the network 120. The client devices 101, 105 may be wireless enabled mobile computing devices (laptops, netbooks, tablets, smart telephones, etc.) and/or wired and/or wireless home computing devices (e.g., a laptop, personal computer, media computer, etc.) and/or Internet of Things (IoT) devices (e.g., smart refrigerator, smart thermostat, voice controlled device) that include applications or frameworks for accessing online data. Example applications for accessing online data include applications such as a web browser, command-line interfaces, widgets, mobile applications, utilities, etc. that request, send, and/or receive data over the network and may present received data to the user (e.g., as rendered web content, command-line text, weather forecast, sports scores, etc.). By way of example, a user of a non-malicious client 101 may utilize a browser application 107 for legitimate purposes to access a web application 120 on a host 145 in order to engage functionality 122 provided by the web application. In another example, a user of a malicious client 105 may utilize an application 109 such as a browser and/or command-line interface for malicious purposes to access a web application 120 on a host 145 in order to exploit a vulnerability 121 of the web application.

In addition, example applications 109 on a malicious client 105 may include malware either as a standalone process and/or process infecting the client, which may include or utilize an existing application and/or framework of the client to perform illegitimate online activities. For example, malware may initiate requests and/or responses to a host 145, malware infecting a browser may cause the browser to initiate illegitimate request and/or responses to the host 145, malware infecting a widget or application may cause the widget or application to initiate illegitimate requests and/or responses to a host 145, and so on, to exploit a vulnerability 121 of a web application 120. Generally, in instances where the application 109 on a malicious client 105 is malware, the application 109 causes the infected client 105 to perform actions the user of the client does not initiate. Oftentimes, the users of the infected clients 105 are unaware of the illegitimate activities of their client devices. Thus, the malicious client 105 may either be directly or indirectly controlled for the purpose of exploiting a vulnerability 121 of the web application 120.

In example embodiments described herein the host 145 may be a computing device (e.g., a server) or collection thereof hosting a web application 120 including functionality 122 for providing dynamically generated web content, database resources, search index resources, ecommerce components, application programming interface (API) endpoints and the like to clients over the network 120. The host 145 may include a web application firewall 110 (WAF) for protecting the web application 120 from attacks targeting vulnerabilities 121 of the web application, which may allow malicious clients 105 access to the host.

For example, a user of a malicious client 105 may utilize application 109 in an attempt to exploit a vulnerability 121 of the web application 120 to bring down the web application/host, or worse yet, breach an organization operating the host 145 to obtain valuable information, and utilize or expose the information for nefarious purposes. The WAF 110 attempts to distinguish legitimate non-malicious client 101 traffic seeking to exploit a vulnerability 121 of the web application 120 from malicious client 105 traffic seeking to access functionality 122 provided by the web application.

With respect to malicious client 105 traffic, the WAF 110 may either identify an attempted exploit 111 or the malicious client successfully exploits 113 a vulnerability 121 of the web application. As described previously, a common issue with a traditional signature based WAF 110 is that they are difficult to deploy and maintain (e.g., their rule set) to stay current with existing and emerging threats to identify exploits 111. Thus, unless a rule set of a signature based WAF 110 is rigorously maintained by a skilled operator, it is likely that a malicious client 105 can successfully exploit 113 a vulnerability 121 of the web application 120. Further, as signature based WAF 110 implementations grow in complexity with the number of rules implemented, the web application 120 behind the WAF will often experience performance issues that negatively affect non-malicious client 101. Profiling/anomaly detection WAFs 110 that attempt to learn patterns in web application traffic by passively inspecting HTTP(s) requests to identify exploits 111 have similar drawbacks. For example, a profile utilized by the profile/anomaly detection WAF 110 can extend poorly to identifying exploits 111 from general and new attack types, as they only capture attacks on specific known vulnerabilities 121. Given these shortcomings, malicious clients 105 often successfully exploit 113 vulnerabilities 121 of web applications 120 behind signature and profile/anomaly detection based WAFs 110.

The solution may not be as simple as merely increasing the sensitivity of these traditional WAF 110 types, as this action causes traditional WAFs 110 to falsely identify more non-malicious client traffic and thus non-malicious clients 101 as malicious ones. This miss categorization, known as a false positive 115, prevents a non-malicious client 105 from accessing the functionality 122 of the web application 120, which an administrator of the WAF 110 must often correct manually. Further, false positives 115 often lead to a negative perception of the web application 120 and/or host 145 because users of non-malicious clients 105 are not permitted access 117 to the functionality 122 of the web application.

New and improved methods, systems and non-transitory computer readable mediums discussed herein not only identify attempted exploits 111 to mitigate successful exploit 113 by malicious clients 105 and permit access 117 to non-malicious clients 101 with reduced false positives 115, but reduce required maintenance input, supervision, and inefficiencies present in traditional WAF implementations.

Model Based WAFs

Figure 2:
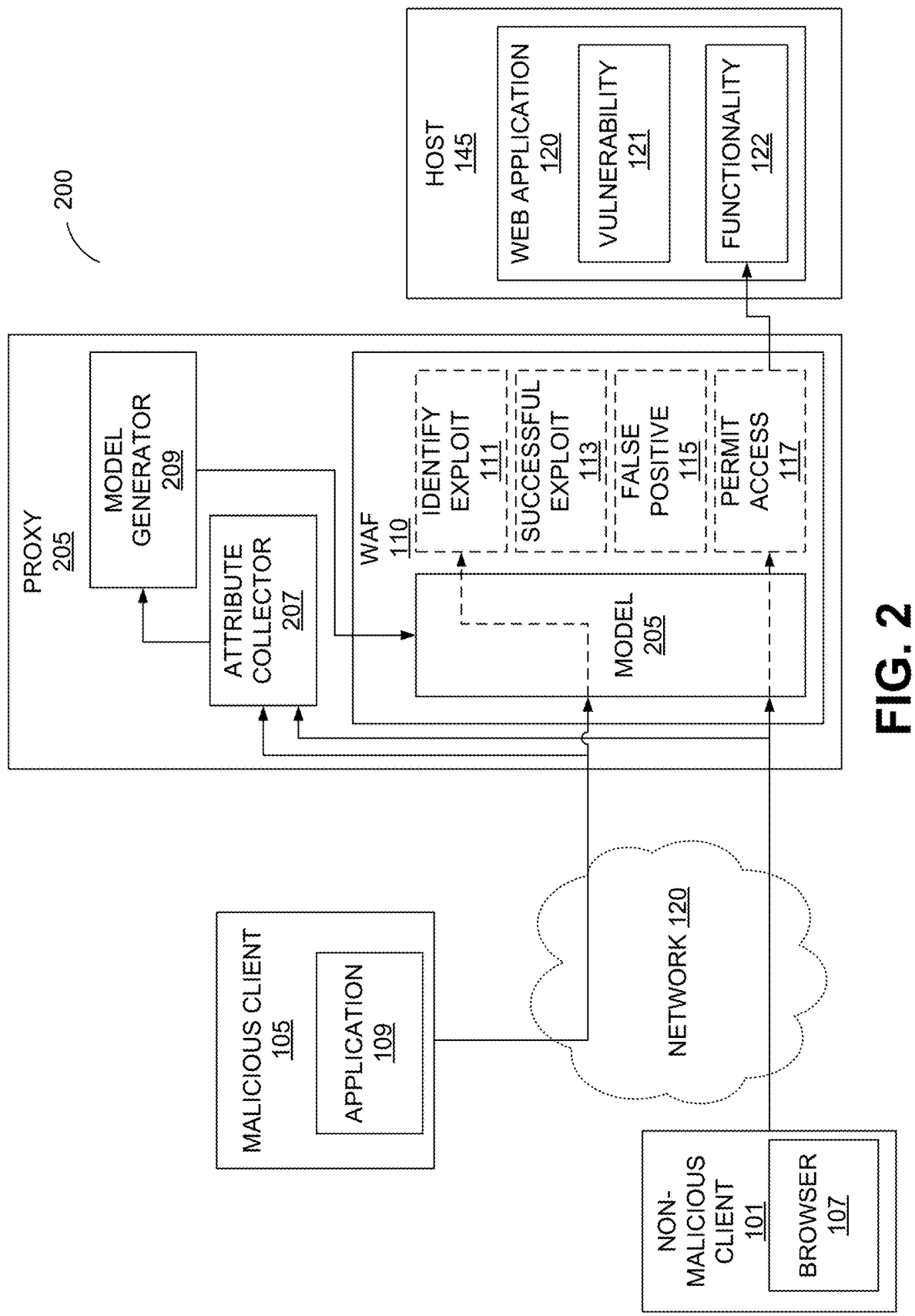
FIG. 2 illustrates a block diagram of an example communications environment including a proxy for mitigating successful exploit of a web application, according to one example embodiment.

FIG. 2 illustrates a block diagram of an example communications environment 200 including a proxy 205 for mitigating successful exploit 113 of a web application 120, according to one example embodiment. The environment 200 in this example comprises the malicious client 105, the non-malicious client 101, a proxy 205, and the host 145.

In one embodiment, the proxy 205 is positioned between the host 145 and the network 120, such that communications between clients 101, 105, and the host 145 flow through the proxy 205. In one embodiment, the proxy 205 is a stand-alone computing device, such as server, or collection thereof that handles traffic between the host 145 and the clients 101, 105. Thus, the proxy 205 may be a server, load balancer, router, or combination thereof located logically and/or physically between the clients 101, 105, the network 120, and/or host 145 to monitor and manage the request/response path between the clients and the host. In other example embodiments, the proxy 205 may be incorporated in the host 145. In yet other example embodiments, one or more the features and functionality of the proxies discussed herein may be incorporated at the host 145 as one or more processes. For example, one or more of the process may be incorporated as modules in a host utilizing APACHE or NGINX web servers. In either instance, the proxy 205 receives traffic (e.g., client requests and responses) from the clients 101, 105, which may then be passed on to the host 145, and receives traffic (e.g., host 145 requests and responses) from the host 145, which may then be passed on to the clients 101, 105. In one embodiment, the proxy 205 is a HTTP(S) proxy that handles traffic (e.g., proxies HTTP/HTTPS traffic) between the host 145 and clients 101, 105. Thus, the proxy 205 provides client access to web application 120 functionality 122 at the host 145 such as dynamically generated web content, database resources, search index resources, ecommerce components, application programming interfaces, and so forth, over the network 120, but without exposing the host 145 directly to the clients.

In some example embodiments, the proxy 205 may also service client 101, 105 requests/responses directly and/or request/respond to the clients as part of its operation. As an example, the proxy 205 may perform request and/or response operations separate from the functionality 122 of the web application 120 at the host 145 in response to a client request or response.

When a client (e.g., 101, 105) engages the host 145 through the proxy 205 to access the web application 120, the proxy 305 may receive a request from the client. For example, the proxy 205 may receive a request for functionality 122 provided by the web application 120 from a non-malicious client 101 and pass the request to the host 145. In turn, the proxy 205 receives a response from the host 145, which may be transmitted to the non-malicious client 101 to provide the non-malicious client 101 with functionality 122 of the web application 120. Alternatively, the proxy 205 may receive a request attempting to exploit a vulnerability 121 of the web application 120. The proxy 205 distinguishes between these requests in order to permit non-malicious clients 101 access 117 to the host 145 for functionality 122 of the web application 120 and identify attempted exploit 111 of the host 145 through a vulnerability 121 of the web application by malicious clients 105.

In one example embodiment, the proxy 205 identifies a subset of received requests as known malicious (e.g., requests received from known malicious clients 105) and known non-malicious (e.g., requests received from known non-malicious clients 101). In one example embodiment, the proxy 205 may identify known non-malicious clients 101 and known malicious clients 105 and thus a subset of requests associated therewith from user agent (UA) and/or internet protocol (IP) combinations known to correspond to non-malicious clients and malicious clients, respectively. For example, the proxy 205 may utilize a white list (of known non-malicious client UA and/or IP combinations) and a black list (of known malicious client UA and/or IP combinations) to identify requests associated with known non-malicious clients 101 and known malicious clients 105. In some example embodiments, the proxy 205 preprocesses one or more received requests with traditional WAF logic but identifies the subset of received requests as known malicious and known non-malicious from the known UA and/or IP combinations (e.g., in order to utilize the traditional WAF classification for subsequent classification by the model 205 based WAF 110). In either instance, the attribute collector 207 collects the subset of identified known malicious and known non-malicious requests.

In one example embodiments, the attribute collector 207 may be configured to collect a plurality of identified malicious requests and their associated attributes and a plurality of identified non-malicious request and their associated attributes for processing by the model generator 209. For example, the attribute collector 207 may collect at least a threshold number of malicious and non-malicious requests and their attributes, at which point the attribute collector 207 may provide the collected requests to the model generator 209 for processing.

In one example embodiment, a request collected by the attribute collector 207 includes static attributes. Generally, static attributes are features that may be derived from the request directly. For an example HTTP(S) request, example attributes may include features such as HTTP Method, HTTP Version, Scheme (e.g., HTTP or HTTPS), Uniform Resource Indicator (URI) (e.g., a unique URI for the HTTP request excluding query string parameters), Number of HTTP Headers, Sorted list of Header name (e.g., delimited by comma or semi-colon), Accept Header, Hostname, Number of Cookies, Total Cookie Length, Cookie NAME list sorted, Number of GET Parameters, Number of POST Parameters, Query String Length, Sorted List of GET Parameter names, Sorted List of POST parameter names, Request body size in bytes, HTTP Response code, HTTP Response size in bytes, etc.

In some example embodiments, the attribute collector 207 may collect static attributes such as whether a Device Fingerprint for the client was determined (True or False) and whether a challenge was passed (True or False) by the client. In some example embodiments, the proxy 205 includes logic for determining a device fingerprint for a client and challenging a client. For example, when the proxy 205 receives a request from a client 101, 105, the proxy may transmit the request to the host and receive content (e.g., corresponding to the functionality 122 of the web application 120) from the host 145 for transmission to the client (e.g., 105). The proxy 205 injects code into the content received from the host prior to transmission of the client 105. The code, when executed by the client 105, is configured to monitor user interactions (or lack thereof) with the content at the client 105 in order to determine whether there is human activity at the client 105 and/or determine client attributes for fingerprinting the client. In one example embodiment, the proxy 205 injects JavaScript code into the content for transmission to the client 105.

In some example embodiments, the code injected into the content and transmitted to the client 105 by the proxy 205 attaches to "canvas" objects when executed by the client. For example, in HTML content transmitted to the client 105, the code injected by the proxy 205 attaches to HTML canvas objects such as mouse, keyboard and scrolling events over/within the HTML content when displayed at the client (e.g., within a browser of the client where such canvas events are indicative of the presence of human activity). In one example, the injected code when executed at the client side, referred to herein as a Canvas Challenge Function (or CCF), monitors for the presence of one or more canvas events over a period of time, e.g., 1-30 seconds, and records detected canvas events in client memory (e.g., as a canvas event record). In turn, the CCF may provide the canvas event record to the proxy 205 for analysis. The CCF may provide the canvas event record to the proxy 205 in a number of ways, for example, through JavaScript, asynchronous JavaScript+XML (AJAX), beacon return, cookie, or combination therefore and the like. Thus, the canvas event record may be communicated to the proxy 205 in a number of ways including: setting a cookie value, AJAX request, or a beacon request.

The proxy 205 may analyze the canvas event record to determine whether the detected canvas events are indicative of human activity. The proxy 205 determines if the canvas event record indicates human activity (passing the CCF) or does not indicate human activity (failing the CCF). The attribute collector 207 may collect an indication of whether a canvas event record received in association with a request (e.g., for content in which the CCF was injected into the response) was determined as PASS (e.g., human actor) or FAIL (e.g., non-human actor) by the proxy 205. On its own, an indication of a non-human actor does not mean a request is malicious as many non-malicious bots such as web crawlers operation in conjunction with search engines to index web pages. However, this attribute value provides the model generator 209 with an additional input factor that may be weighed against other attributes associated with a request in identifying whether the request implicates a malicious bot as opposed to a non-malicious bot.

In some example embodiments, as clients 101, 105 engage the host 145, the proxy 205 determines an identity of each of the clients engaging the host, referred to herein as a client fingerprint. The client fingerprint provides a relatively stable representation of a client 101, 105 such that a client (e.g., 101) may be distinguished from other clients (e.g., 105) engaging the host. In turn, the proxy may build a store of "fingerprints" corresponding to clients having engaged the host 145 and whether a given client has passed or failed one or more CCFs.

In some embodiments, the CCF may include additional code (e.g., JavaScript) to determine a client fingerprint in addition to recording browser canvas events. Thus, the code injected by the proxy 205 in host 145 responses queries the client for client attributes (e.g., of the client and/or browser) when executed by the client. The code for determining the client fingerprint may provide the client attributes to the proxy 205 in a fashion similar to the providing of browser canvas events. In some embodiments, the cookie, AJAX call, and/or beacon request include both canvas event record information and client attribute information. In some embodiments, the canvas event record and/or client attribute information are hashed at the client and the hash(s) thereof are provided to the proxy. In either instance, the attribute collector 207 may collect an indication of whether a device fingerprint has been received (e.g., YES or NO) from a client associated with a request (e.g., in a cookie header presented to the proxy 205 with the request or via AJAX or a beacon request).

In some example embodiments, the attribute collector 207 collects static attributes for a request from a traditional WAF. For example, as described previously, the proxy 205 may preprocess one or more requests through a traditional WAF. Preprocessing requests through a traditional WAF may provide additional attributes for model generation 209. Specifically, whether a known malicious request triggered an alert of the traditional WAF (and thus whether it did not trigger any alert) and whether a known non-malicious request triggered an alert of the traditional WAF (e.g., false positive). As traditional WAF negative signatures may trigger in the case of malicious requests (True Positives) and non-malicious requests (False Positives), the tracking of whether the request is actually malicious/non-malicious may be determined from known user agent/IP combinations in blacklists of malicious clients 105 and whitelists of non-malicious clients 101. In both cases, capturing the specific traditional WAF Rule IDs that are triggered may provide a valuable piece of information for ingestion by the model generator 209. For example, if a Cross Site Scripting Rule ID is triggering for known non-malicious requests with a specific set of other attributes, the model generator 209 may factor the triggering of this negative rule as a known non-malicious behavior rather than malicious. Accordingly, the attribute collector 207 may collect a list of negative traditional WAF Alerted ruleIDs if any were triggered by a request when processed by a traditional WAF.

Once the attribute collector 207 collects enough (e.g., above a threshold number of) identified malicious requests and their associated attributes and identified non-malicious request and their associated attributes, the collection of requests may be ingested by the model generator 209.

The model generator 209 may be configured to ingest a collection of known malicious requests and their associated attributes and known non-malicious requests and their associated attributes. The model generator 209 processes the requests to generate (e.g., train) a model 205 for classifying unknown requests (e.g., the majority of requests) based on their attributes. For example, once the model generator 209 generates a model 205, the model may be implemented as a component of a WAF 110 at the proxy 205 for classifying requests received from clients that are not known to be malicious or non-malicious (e.g., traffic sources not identified to the proxy 205 for training data collection by the attribute collector 207).

In various example embodiments described herein, the model generator 209 utilizes supervised learning for generating a model 205. Supervised Learning relates to a branch of Machine Learning and Artificial Intelligence that utilizes a set of data with labels associated to each data point. For example, in the case of ingested requests, a set of data with values may correspond to the attributes of a request, e.g., request 1: malicious "0", number of cookies "5", HTTP method GET "1", HTTP method POST "0", etc., or request 2: malicious "1", number of cookies "0", HTTP method GET "0", HTTP method POST "1", etc. Data points, and thus the requests, may be represented as n-dimensional vectors of values (e.g., 1, 0 for True, False, real numbers for whole values, another vector etc.) where n corresponds to the number of values (e.g., attributes) being learned. In the above example, request 1 may be represented by a vector of [0, 5, 1, 0, etc.] and request 2 by [1, 0, 0, 1, etc.] where each request vector includes the values for all the attributes collected for each request. In addition, an attribute value may be represented by a vector where multiple values exist. For example, rather than identifying the value for HTTP method POST and GET individually, HTTP method may be represented as a vector of possible values GET, POST, etc. Thus, for request 1, HTTP method value may be represented by X1=[0, 1] and request 2 by value X2=[0, 1]. Accordingly, request 1 may be represented by [0, 5, X1, etc.] and request 2 by [1, 0, X2, etc.] where X1 and X2 are the respective vectors for the individual attributes. The model generator 209 takes these request vectors and generates a model 205 for classifying incoming requests, which may similarly be represented as vectors of their attribute values, as "malicious" or "non-malicious."

While the attributes in the vector include the static attributes that may be inferred from requests without computation or significant manipulation, the attributes may also include derived attributes. In one embodiment, derived attributes are attributes that are inferred by application of a function to the requests that may require external lookup or significant calculations. In some embodiments, the model generator 209 determines one or more derived attributes for each ingested request, which may be added to the vector including static attributes. For example, the model generator 209 may determine one or more derived attributes with "less than sign" variations such as: GET Parameters contain basic '<' with variations, POST Parameters contain basic '<' with variations, Cookies contain basic '<' with variations, and Header Values contain basic '<' with variations. These attributes and their values (e.g., True "1" or False "0" and/or the character evasion) may implicate evasion techniques utilized to exploit traditional WAFs and may be vectorized as request attributes for processing by the model generator 209. Table 1 (below) illustrates example character evasions that may be examined to derive values for attributes with less than sign variations.

basic ' single quote with variations, GET Parameters contain malicious OS keyword list, POST Parameters contain malicious OS keyword list, Cookies contain malicious OS keyword list, Header Values contain malicious keyword list, Country code of client IP, User Agent Validity, User Agent Type (e.g., Mobile, Desktop, non-malicious bot, malicious bot inferred from device fingerprint), IP exists in BOT IP list (e.g., non-malicious bot whitelist), IP exists in a Global Threat Intel List (e.g., blacklist), WHOIS Information for client IP, Client Request Rate per Minute at time of request receipt, etc.

In some example embodiments, the model generator 209 may utilize active learning to improve upon and update generated models 205 through additional training iterations. Active learning may begin as a supervised learning problem as described above. Active learning recognizes that once the model generator 209 trains a model 205, this initial model 205 may not initially achieve every desired prediction. An active learning process of the model generator 209 allows human domain experts to inspect ambiguous unlabeled data points (e.g., requests) to make a decision as to the classification (e.g., malicious or non-malicious) the model 205 should have determined for the data points. As an example, in active learning, the model 205 may output requests that it does not unambiguously classify for administrator review. The administrator may be prompted to select a classification for a request the model 205 did not unambiguously classify. In turn, the model generator 209 may ingest the now classified request along with the collection of requests collected by the attribute collector 207 to incrementally update the model 205. Depending on the embodiment, the model generator 209 may retrain on the newly classified and previous known requests and replace the initial model with the newly trained model 205. Embodiments utilizing active learning may incrementally raise accuracy to reduce false positives and false negatives by retraining models with the model generator 209 in instances where ambiguous classifications and/or false positives/false negatives are identified from the classifications provided by the current model 205.

TABLE 1

Character Evasions

| < | % 3C | &lt | &lt; |
|---|---|---|---|
| < | < | &#60 | &#060 |
| &#0060 | &#00060 | &#000060 | &#0000060 |
| &#60; | &#060; | &#0060; | &#00060; |
| &#000060; | &#0000060; | &#x3c | &#x03c |
| &#x003c | &#x0003c | &#x00003c | &#x000003c |
| &#x3c; | &#x03c; | &#x003c; | &#x0003c; |
| &#x00003c; | &#x000003c; | < | < |
| < | < | < | < |
| < | < | < | < |
| < | < | &#x3C | &#x03C |
| &#x003C | &#x0003C | &#x00003C | &#x000003C |
| &#x3C; | &#x03C; | &#x003C; | &#x0003C; |
| &#x00003C; | &#x000003C; | < | < |
| < | < | < | < |
| < | < | < | < |
| < | < | \x3c | \x3C |
| \u003c | \u003C | | |

Additionally, the model generator 209 may determine one or more derived attributes such as: GET Parameters contain basic ' single quote with variations, POST Parameters contain basic ' single quote with variations, Cookies contain basic ' single quote with variations, Header Values contain Profile/Anomaly detection WAFs differ from this approach in that they are unsupervised and the number of labeled positive examples is zero. Positive examples (e.g., malicious requests) may be utilized to verify a profile/anomaly detection WAF but are not considered in generating profiles themselves. In contrast, the model generator 209 ingests both positively labeled (e.g., known malicious requests) and negatively labeled (e.g., known non-malicious requests) training examples. In addition, the requests collected by the attribute collector 207 may be specific to the web application 120 to which the requests are directed. Hence, the model generator 209 may train a model 205 for any number of web applications.

In example embodiments described herein, the model generator 209 may train one or more models 205 using one or more processes from logistic regression, neural networks, support vector machines, random forest trees, gradient boosting machines, and other types of supervised learning classifier algorithms.

Once a model 205 has been trained, a set of request attribute parameters (theta) constituting the model obtained from the model generator 209 may be utilized by the WAF 110 for classifying received requests. In one example embodiment, the model 205 with attribute parameters is stored at the proxy 205 to perform WAF 110 functions for real-time classification of received requests based on their attributes. In other example embodiments (e.g., as described with reference to FIG. 3), the model 205 is offloaded (e.g., to another server or process) and the proxy 205 initiates a web service call to receive a classification for a received request.

The WAF 110, which includes the model 205, may be configured to receive requests from clients 101, 105 and classify the requests. Specifically, the model 205 may classify a request based on its associated attributes as either malicious (e.g., "1") or non-malicious (e.g., "0"). The model 205 takes as input the attributes of the request, which may include the static attributes and/or one or more derived attributes, and predicts whether the request attributes when processed as a function of the attribute parameters (theta) implicates a malicious or non-malicious client. The model 205 may label the request based on the prediction, e.g., 1 for malicious or 0 for non-malicious, and the WAF 110 takes appropriate action in response.

By way of example, for requests labeled by the model 205 as non-malicious, the WAF 110 permits access 117 to the host 145 by forwarding the request to the host so that non-malicious clients 101 may access the functionality 122 of the web application 120. For requests labeled by the model 205 as malicious, the WAF 110 identifies these requests as exploits 111 and does not pass the requests to the host 145. The model 205 itself, which is based on known malicious request attributes and known non-malicious requests attributes, reduces the likelihood of successful exploit 113 of web application 120 vulnerability 121 due to false negatives and reduces the likelihood of false positives 115. In some example embodiments, the model 205 may not affirmatively classify a request as malicious or non-malicious, in which case an administrator may review and classify the request for ingestion by the model generator 209 to incrementally update the model 205 (e.g., in an active learning process). Further, if one or more requests from a client 101 previously determined to be non-malicious are classified as malicious by the model 205, an administrator may review the requests to determine whether the client 101 is still engaging in non-malicious activities (false positive) or whether the client is now malicious (true positive). In the case of false positives, these requests and their attributes may be classified by the administrator as non-malicious and provided to the model generator 209 for ingestion. In the case of a true positive, the administrator may categorize one or more requests not determined to be malicious by the model 205 (false negative) as known malicious. Accordingly, the model generator 209 may ingest the requests classified by the administrator and regenerate the model 205 to further reduce the rate of successful exploits 113 from malicious requests and false positives 115 from non-malicious requests.

Distributed System

Figure 3:
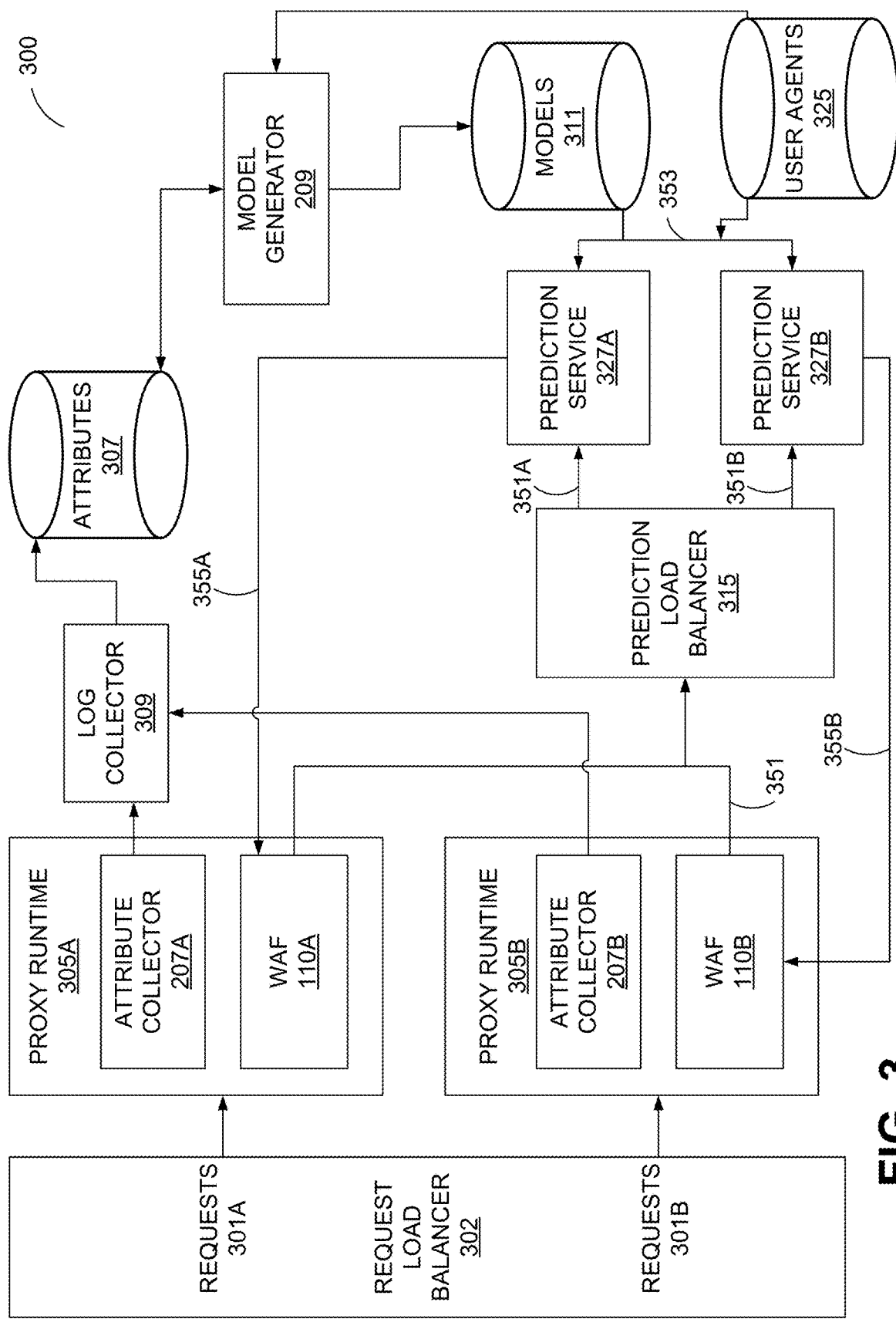
FIG. 3 illustrates a block diagram of an example communications environment including a distributed proxy system for mitigating successful exploit of a web application, according to one example embodiment.

FIG. 3 illustrates a block diagram of an example communications environment 300 including a distributed proxy system for mitigating successful exploit of a web application, according to one example embodiment. The environment may include a request load balancer 302, proxy runtimes 305, log collector 309, attribute database 307, model generator 209, model database 311, user agent (UA) database 325, prediction load balancer 315, and prediction services 327.

The load balancer 302 may be a standalone device or included at a proxy (e.g., similar to proxy 205 describes with reference to FIG. 2) having one or more proxy runtimes 305. As a standalone device, the load balancer 302 may load balance received requests 301 between proxy runtimes 305 also on standalone devices. Thus, for example, proxy runtime 305A and proxy runtime 305B may each be a proxy similar to that with described with reference to FIG. 2. The system of FIG. 3 differs from that of FIG. 2 in that model generation is offloaded from the proxy runtimes 305. Additionally, request classification by a model may be offloaded to prediction services 327 from the proxy runtimes 305 handling the requests, as shown in FIG. 3. However, in other example embodiments, the proxy runtimes 305 may include a prediction service 327 (e.g., as with proxy 205 including a model for classification). In fact, the blocks illustrated in FIG. 3 may be grouped in various ways for efficiently classifying requests.

In one example embodiments, the load balancer 302 and proxy runtimes 305 may be standalone devices. Similarly, the log collector 309, model generator 209, prediction load balancer 315, prediction services 327 and databases 307, 311, 325 may be all exist as standalone devices. Alternatively, they may be logically grouped. For example, the log collector 309 and model generator 209 may exist on a same device. Likewise, the prediction load balancer 315 and prediction services 327 may exist on a same device. Logically, the blocks perform functions distributed from the proxy device (e.g., 205) described with reference to FIG. 2. The distribution of functions can aid in classification efficiency where multiple proxy services and hosts are operated and/or web applications are protected, and is described in more detail below.

The request load balancer 302 may be configured to receive requests 301 from clients (not shown) and load balances the requests between one or more proxy runtimes 305. Thus, for example, in instances where multiple proxy servers handle requests, and/or a proxy server includes multiple runtime instances 305, the request load balancer 302 may balance the number of requests each proxy and/or proxy runtime 305 receives. In the illustration, the load balancer 302 balances received requests 301A, 301B between proxy runtime 305A and proxy runtime 305B, respectively.

The proxy runtimes 305 may include an attribute collector 207 and a WAF 110. When a proxy runtime 305A receives a request 301A, it may identify the request as a known malicious or known non-malicious request from a blacklist or whitelist, respectively. The whitelist and blacklist may contain information from the user agent database 325 that includes known UA/IP combinations and (optionally device fingerprints for additional granularity), which may be labeled known malicious/non-malicious such that the proxy runtimes 305 may identify requests for training.

In some example embodiments, a system administrator for a web application which the proxy runtimes 305 serve to protect identifies a combination of known IP addresses and User Agent strings for both malicious and non-malicious traffic sources, which may be stored (optionally with device fingerprints for additional granularity) in the user agent database 325 and selected for request identification by the proxy runtimes 305. In turn, the proxy runtimes 305 check received requests 301 against the selected known non-malicious/malicious IPs and User Agents and tag each request as known malicious, known non-malicious, or in most cases unknown. Notably, only a small portion of overall traffic may be labeled as known malicious or known non-malicious for model training. This is an important differentiating point from traditional WAFs, because production systems may collect training data without the need for application segregation. That is, a model can be created for a legacy web application where no separate instance of the application exists.

In some embodiments, a system administrator for a web application may generate malicious and non-malicious traffic through a proxy runtime (e.g., 305A) with the respective sources identified as known malicious or known non-malicious to produce training data. For example, the system administrator may execute manual and automated testing against the web application. The administrator may perform manual testing of web application functions, forms and AJAX pages or Automated testing of the web application through tools such as Selenium, Load Runner, JMeter, Phantom JS, etc. which step through a web application and test links, forms, AJAX requests and various features while recording the steps in the background. In turn, automation scripts of the recorded steps may be re-run as many times as needed to perform functional testing and regression testing. These methods allow for a repeatable test script to run for the recording of both malicious and non-malicious web request activity. Additionally, the administrator may perform automated crawling of the web application, automated vulnerability scanning through open source tools and commercial off the shelf software, automated exploitation of vulnerabilities through open source and COTS, etc. As described above, the sources generating the web traffic are identified to the proxy runtimes 305 by user agent and/or IP combinations from the user agent database 325 such that these known malicious and known non-malicious requests are identified by the proxy runtime 305A for collection at the attribute collector 207A.

The known malicious and known non-malicious requests and their associated attributes are stored by the attribute collector 207A. In one embodiment, the proxy runtime 305 processes requests through a traditional WAF and the attribute collector 207A stores the traditional WAF outputs as request attributes. Thus, the attribute collector 207A stores a plurality of known malicious and known non-malicious requests and their attributes (e.g., in a log) that were identified at proxy runtime 305A and the attribute collector 207B stores a second plurality of known malicious and known non-malicious requests (e.g., in a log) and their attributes that were identified at proxy runtime 305B. Example embodiments may include many such proxy runtimes 305.

The log collector 309 may be configured to collect requests and their attributes from the attribute collectors 207 of proxy runtimes 305. In an example embodiment, the log collector 309 periodically queries attribute collectors (e.g., 207A, 207B) for logs including requests and their attributes. In another example embodiment, an attribute collector may periodically provide a log of requests and their attributes to the log collector 309. In either instance, the log collector 309 collects logs of requests and their attributes and consolidates the requests and their associated attributes in the attributes database 307.

The attributes database 307 may be configured to maintain the plurality of known malicious and non-malicious requests collected from one or more proxy runtimes 305 by the log collector 309. Additionally, the attributes database 307 may store determined information for each request. For example, the attributes database 307 may store a request in association with its static attributes, any derived attributes for the request, and/or a vector representation of the static and/or derived attributes for the request.

The model generator 209 may be configured to segregate the known malicious requests and known non-malicious requests into respective collections within the attributes database 307 based on their initial identification provided by the proxy. Prior to addition of a request to its collection, the model generator 209 may determine whether a request with duplicate attributes already exists in the group such that computation time is not spent on processing same request data over again. In one embodiment, the model generator 209 performs a comparison between a request to add across the other requests in the collection to identify whether the request is identical to another request. The comparison may ignore one or more unique factors of a request that do not directly influence model generation. For example, attributes as timestamp, device fingerprint (e.g., as a hash or certain fingerprint information such as screen size, resolution, etc. which are useful for individual device identification but do not provide additional insight relative to malicious/non-malicious requests), an assigned request ID and other factors which may be unique per request but do not directly influence the model feature set may be ignored when determining whether to discard a duplicate request.

The model generator 209 may be configured to ingest the collection of known malicious requests and their associated attributes and known non-malicious requests and their associated attributes from the attributes database 307. The model generator 209 may access the user agent database 325 to obtain information about a client (e.g., Has Device Fingerprint) and/or for determining other attributes. For example, once a proxy runtime 305 determines a fingerprint for a client, that information may be provided to the user agent database 325 for identifying whether a client has a fingerprint in addition to whether a fingerprint was returned (YES/NO) in association with a given request. The model generator 209 may ingest a request to determine static attributes, derived attributes, and/or a vector representation and store the information in the attributes database 307 in association with the request prior to, or coincident with model generation. For example, the model generator 209 may vectorize the request, and one or more request attributes.

In one embodiment, the model generator 209 may be configured to create a vector for the request with size n where n equals the number of attributes. Additionally, one or more attributes may be represented by a vector with size i where i equals the number of possible values for the attributes. Each value in the one or more vectors may be initialized to zero. For example, an example request having n=5 attributes may have a vector of [0, X, 0, 0, 0] and the attribute with 4 possibilities represented by a vector, X, is also initialized all zero values, e.g., X=[0, 0, 0, 0] for i=4 possibilities.

The model generator 209 may be configured to populate the vectors initialized for ingested requests with values based on their static and/or derived attributes. For example, if the first attribute represents known malicious/non-malicious True/False value, the model generator 209 populates the vector with the 1×1 Boolean value, e.g., [1, X, 0, 0, 0] for a malicious request (e.g., as identified when collected by the proxy runtime 305A), and continues for the remaining attributes. With respect to attributes having vector values, such as an HTTP method attribute represented by X, if there are 4 possible values (i): GET, POST, PUT, DELETE that are possible, the following attribute vector may be created, as shown in TABLE 2.

TABLE 2

| HTTP METHOD VECTOR | | |
|---|---|---|
| | i0 = 0 or 1 | Representing Unknown |
| X = [ i1, i2, i3, i4 ] | i1 = 0 or 1 | Representing GET |
| | i2 = 0 or 1 | Representing POST |
| | i3 = 0 or 1 | Representing PUT |
| | i4 = 0 or 1 | Representing DELETE |

Thus, for a request having HTTP Method with POST=1, the model generator 209 may store a corresponding attribute vector X=[0, 1, 0, 0] for the request. In some embodiments, a value of a categorical attribute vector may be reserved to represent an unknown or untracked value. As illustrated in TABLE 2, an additional i0 term may be included to account for an unknown or untracked HTTP method (e.g., OPTIONS) that may be identified from the request. Accordingly, the attribute vector X may be represented as [1, 0, 0, 0, 0] to indicate an unknown method. Previously untracked/unknown values for an attribute are an important identification that may influence the result of a prediction. These unknown/untracked values may be reviewed for to identify additional possibilities for an attribute (e.g., prior to model generation or subsequent model update). Hence, the additional i0 term may be included by initializing attribute vector length to (i+1) where i=known/tracked possibilities. In one example embodiment, the first position in a categorical attribute vector may be reserved for an "unknown" indication.

Some values of static and/or derived attributes are numeric and not category classifications. For example, a value for Query String Length, number of cookies, request body size, etc. may be an integer. In this case, the attribute may be represented as an attribute vector of size 1×1 with an integer value for the feature, e.g., 20. Thus, the model generator 209 may populate the value in the request vector as [1, X, 20, 0, 0], where X=[0, 0, 1 (POST), 0, 0], and so on. The model generator 209 may consider the values of combined (and 1×1) feature vectors for classification. In some embodiments, integer value attributes values are normalized to a value range of 0 to 1 or alternatively −1 to 1 to avoid excessive weight to any attribute represented by real numbers that may potentially have large values. Once the model generator 209 vectorizes the requests in the attributes database 307, a model may be trained from the collections of known malicious requests and their associated vectors and known non-malicious requests and their associated vectors.

Figure 5:
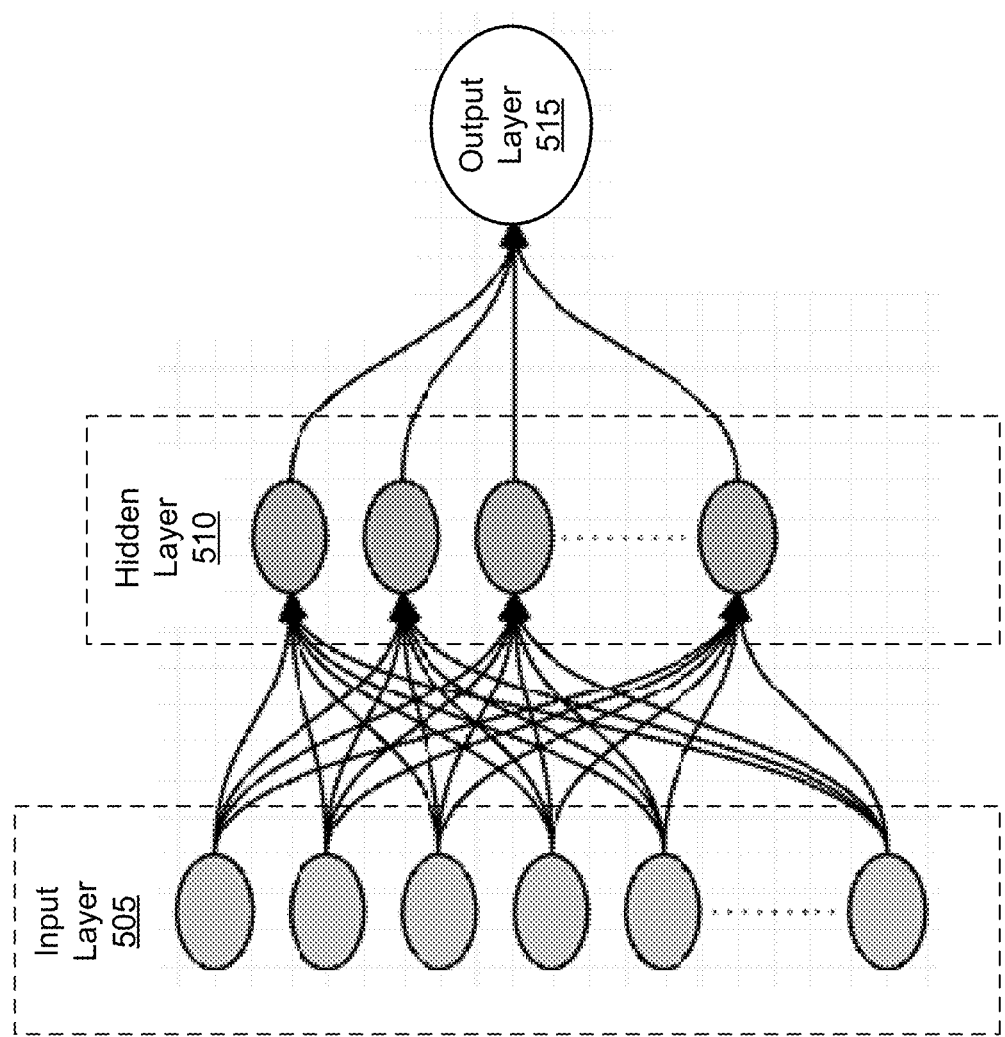
FIG. 5 illustrates an example representation of an artificial neural network (ANN), according to an example embodiment.

The model generator 209 may be configured to process the vectorized requests to generate (e.g., train) one or more models stored in the model database 311 for classifying requests based on their attributes. Turning to FIG. 5, an example representation of an artificial neural network (ANN) is shown, according to an example embodiment. An input layer 505 includes inputs equivalent to the number of attributes in the request vector, which are distilled to a hidden layer 510. In one example embodiment, the hidden layer 510 size is roughly half that of the input layer 505. In other words, if 100 attributes are in the input layer 505, the hidden layer 510 may have a size of 50. The hidden layer 510 and the corresponding input layer 505 values make it possible for the ANN to exhibit non-linear behavior. Specifically, the hidden layer 510 permits relationships across input layer 505 values implicating whether a request is malicious or non-malicious that are not necessarily captured by linear processing techniques. The output layer 515 is then based on the relationships capture by the hidden layer 510, and outputs a label for an unlabeled input request (e.g., malicious "1" or non-malicious "0"). Absent one or more hidden layers 510 in the ANN, a similar result could be achieved with linear logistic regression or a Support Vector Machine with a linear kernel function. By way of example, a proposed solution includes about half the number of hidden layer 510 values relative to the input layer 505 of attribute values. Additional hidden layers 510 and values within each layer may be permitted to achieve similar outcomes in alternative implementations. Striking a balance between the number of input layer 505 values the number of hidden layers 510 permits the representation of non-linear relationships between attributes while still being able to generalize output layer 515 determinations to requests processed with the model.

Prior to training, the model generator 209 may further divide the collections of known malicious and known non-malicious requests into a training data set, cross validation data set, and test data set. In other embodiments, the model generator 209 may cross validate and test with new known malicious/non-malicious requests stored to the attributes database 307 by the log collector 309. For an example division scheme, the model generator 209 may utilize 70% of requests for training, 15% for cross validation, and 15% as the test set, although other divisions may be used.

The training data set is ingested by the model generator 209 for determining and adjusting weights associated with generated models (e.g., a model is generated based on the requests in the training data). In an example embodiment, the model generator 209 may be configured to train an ANN model based on the malicious requests and non-malicious requests in the training data set by solving a minimization problem for the Cost or Error of the ANN over multiple iterations of the ANN. The model generator 209 may utilize a back propagation algorithm for the cost minimization algorithm. In an example embodiment, the Cost or Error is a measurement of how close the learning model hypothesis function matches to the labeled requests (know malicious/non-malicious) in the training set. A high cost/error suggests that the produced hypothesis does not fit the training data well and further training is required. In one example embodiment using ANNs, the process of back propagation attempts to find the parameters of the learning model that most closely fits the labeled requests in the training set.

Alternatively, classification algorithms such as Support Vector Machines, Logistic Regression and other Supervised Machine Learning classification algorithms may be used separately or in combination with an ANN. The alternative methods mentioned above are classifiers that may produce similar results to an artificial neural network. To achieve a non-linear relationship between the input parameters and the desired prediction, Logistic Regression may be trained with a set up polynomial features that are products or combinations of the input attributes. For example, if attributes x1 and x2 are selected features for the learning model, polynomial features may be represented as the product of x1 and x2, the product of $x1^2$ and $x2^2$, and so-on. In addition, Support Vector Machines may be trained with a non-linear kernel to achieve the representation of non-linear relationships between features. An example of a non-linear kernel is a Gaussian kernel. Additionally, the model generator 209 may train more than one type of model. For example, the model generator 209 may initially train a Support Vector Machine (SVM) due to the computational efficiency of the algorithm during training time combined with the complex non-linear decision boundaries that can be created by an SVM and subsequently train an ANN model to capture additional non-linear characteristics between request attributes. In one embodiment, generated models are stored by the model generator within the model database 311.

Once an initial model is created, the model generator 209 may perform one or more testing iterations on a model to verify and/or optimize the model. For example, through testing iterations the model generator 209 may determine improved regularization parameters (in the case of SVMs) and update a number of hidden layers in the case of ANNs. In one example embodiment, the model generator 209 utilizes a set of requests reserved for cross validation to verify validity of the model, and inputs a set of requests in a test data set to compute overall accuracy. The cross validation set is used to minimize overfitting of a model to the training data set. Specifically, the model generator 209 utilizes the cross validation set to verify that an indicated increase in accuracy of the model fitted to the training data during training iterations also translates to an actual increase in accuracy over the requests in the cross validation set. If the accuracy over the training data set increase, but the accuracy over the cross validation set decreases, that is an indication that the model (e.g., the ANN) is being overfitted and further training would decrease accuracy. The test set, in turn, by presenting requests not factored into the training is utilized by the model generator 209 to confirm the predictive accuracy of the model. The model generator 209 may compute one or more of the following metrics based on model output for requests in the test data set to represent model accuracy to the system administrator. Accuracy Rate as a percentage of total requests predicted correctly in the cross validation and test data sets. False Positive Rate as a percentage of total requests predicted as malicious but where the requests were labeled as known non-malicious. False Negative Rate as a percentage of total requests predicted as non-malicious but where the requests were labeled as known malicious. Precision (P) as a measure of True Positives/(True Positives+False Positives), Recall (R) as a measure of True Positives/(True Positives+False Negatives) and a Balanced F Score: $2*(P*R/(P+R))$. The F Score may be monitored by the model generator 209 to optimize the model, by choosing a malicious prediction threshold that maximizes F as a tradeoff between the Precision (P) and Recall (R) metrics.

Figure 6:
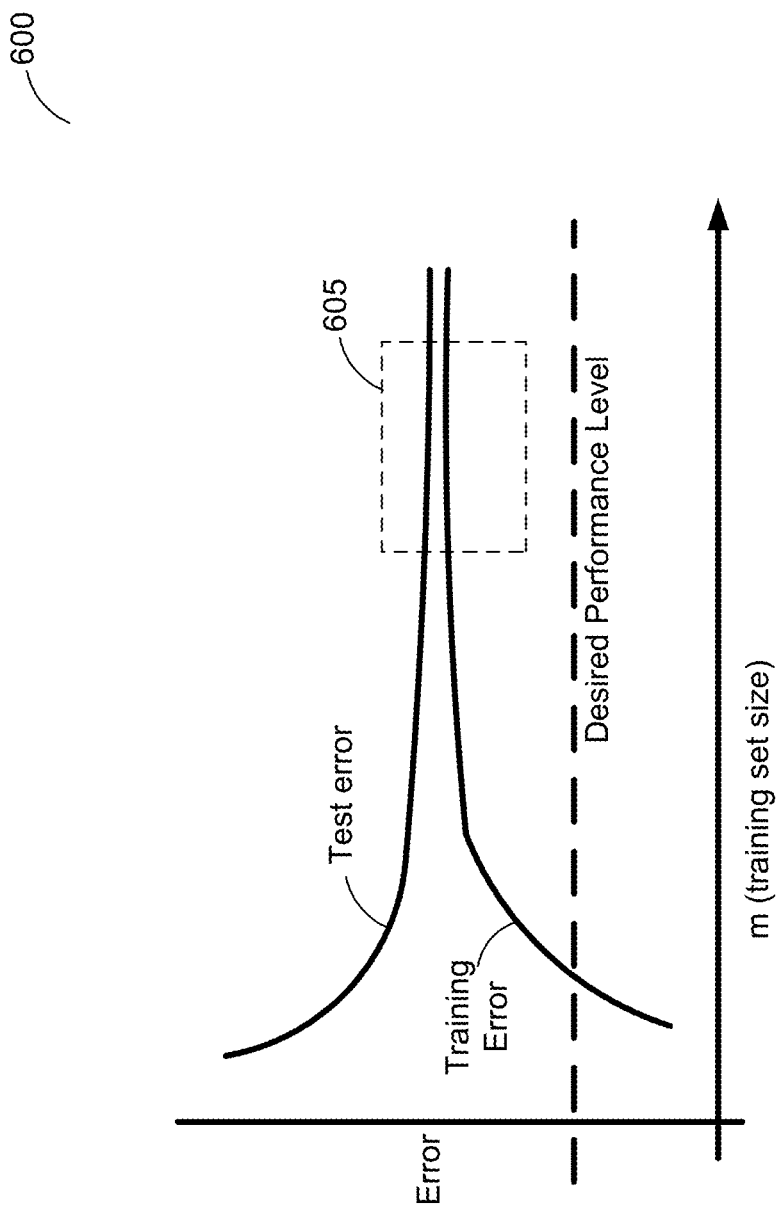
FIG. 6 illustrates an example learning curve graph to aid administrators in visualizing the effectiveness of a model at predicting malicious/non-malicious requests for a given number of requests in the training set, according to an example embodiment.

During training, the model generator 209 may generate a graph from the results of training iterations to representing the cost function of the algorithm over the number of iterations trained. In one embodiment, the model generator 209 generates the graph for presentation to a system administrator representative of the training iterations. Turning to FIG. 6, an example learning curve visualization graph 600 is shown that aids administrators in visualizing the effectiveness of a model at predicting malicious/non-malicious requests for a given number of requests in the training set, according to an example embodiment. In one example embodiment, the model generator 209 generates the interface. The learning curve visualization 600 allows a system administrator to visually determine whether desired classification performance has reached at least a minimum desired performance level for the model, along with the evaluation of accuracy metrics such as Balanced F Score, Accuracy %, False Positive % and False Negative % previously described. The model generator 209 may update the visualization graph 600 for a model as the set of requests for training grows over time to show a convergence 605 between the test error and training error in the learning curve. The training error curve represents the error rate as measured by evaluating the examples used to train while the test error curve represents the test error which is calculated across all examples against the most recently trained iteration of the model. Once a model exceeds a desired performance level, the model generator 209 and/or administrator may mark the model as live in the model database 311.

The model database 311 may be configured to store models being trained and/or active within the system. In example embodiments, the model database 311 may store models specific to particular web applications. Thus, for example, a proxy runtime 305A protecting multiple web applications and/or multiple proxy runtimes 305 protecting different web applications may rely on a consolidated model database 311.

As described previously, the proxy runtimes 305 check received requests 301 against the selected known non-malicious/malicious IPs and User Agents and tag each request as known malicious, known non-malicious, or in most cases unknown. The known malicious and known non-malicious requests and their attributes are collected by the attribute collector 207A for training. In addition, the known non-malicious requests may be passed on to a host for accessing web application functionality. If a request 301A received by the proxy runtime 305A is unknown, it may be processed by the WAF 110A. Similarly, unknown requests 301B identified by proxy runtime 305B are processed by the WAF 110B. The unknown requests 301A, 301B, may be preprocessed through traditional WAF logic to determine attributes about the requests. The WAFs 110 determine request attributes, which may include static and/or derived attributes. In some embodiments, the WAFs 110 determine a first portion of request attributes, e.g., traditional WAF classification, CCF Pass/Fail, Device Fingerprint Received True/False, etc. and a second portion of attributes (e.g., derived attributes requiring additional processing) are determined later (e.g., by a prediction service). In either instance, the WAFs 110A, 110B queries 351 the prediction load balancer 315 with information about received unknown requests 301A, 301B (e.g., the request and/or its associated attributes) for request classification by a prediction service 327. Thus, for example, when the WAF 110 receives a non-malicious classification "0" the request is forwarded to a host. In one example embodiment, a WAF 110 may service a request while awaiting its classification from a prediction service 327. If a malicious classification (e.g., "1") is received for the request, future requests associated with the client and/or any pending host responses for transmission to the client may be blocked. Alternatively, the WAF 110 may wait for request classification prior to servicing the request. In some example embodiments, where the WAF 110 is configured to wait for request classification, it may service one or more subsequent requests while awaiting their classification after servicing one or more requests having received a non-malicious classification.

The prediction load balancer 315 may be configured to load balance received classification queries 351 across one or more prediction services 327. As shown, the classification query for request 301A is passed 351A to prediction service 327A and the classification query for request 301B is passed 351B to prediction service 327B. In some example embodiments, the prediction load balancer 315 load balances the queries according to a prediction service 327 that classifies requests for a particular web application. For example, the load balancer 315 may identify a prediction service (e.g., 327A) to service a query 351A based on a URI associated with the request corresponding to a model loaded in memory from the model database 311 by the prediction service 327.

A prediction service 327 may be configured to load 353 a model from the model database 311 into memory in order to classify requests in response to queries received from WAFs 110. The prediction services 327A, 327B, may load 353 different models in instances where classification queries are directed to different web application protected by the system. A prediction service 327 may determine additional request attributes, either static and/or derived, not provided by a WAF with the query. For example, the prediction service 317 may access a user agent database 325 to determine client information associated with a request. Once a prediction service 327 obtains the set of request attributes from input into the model, the prediction service 327 classifies the request with the loaded model. In turn, the model provides a classification for the request based in its attributes, such as malicious "1" or non-malicious "0". In some instances, the model may not definitively classify the request, in which case an administrator may be alerted for review of the request. The prediction service 327 may default to either a 1 or 0 classification transmitted to a WAF 110 in response to an indefinite classification, pending administrator review.

For the classification query for request 301A received 351A at prediction service 327A, the prediction service 327A transmits 355A the determined classification to the WAF 110A. Accordingly, the WAF 110A may take appropriate action in permitting or denying the request 301A and/or future requests from the client based on the classification. Similarly, in response to the classification query received 351B at prediction service 327B for request 301B, the prediction service 327B transmits 355B the determined classification to the WAF 110B. Accordingly, the WAF 110B may take appropriate action in permitting or denying the request 301B and/or future requests from the client based on the classification.

For example, in response to a received malicious classification of a request as malicious, a WAF 110 may either block the request and/or future requests associated with the client if operating in a BLOCK mode or generate a log line entry as an administrator alert if operating in an ALERT mode and optionally service the request.

During operation, the initial request training set utilized by the model generator 209 may be expanded upon to provide WAFs 110 with more accurate classifications from the prediction service 327. For example, recognizing that a model loaded by a prediction service 327 may occasionally make mistakes, requests which generated log-line entries and/or received an indefinite classification may be provided for administrator review. Thus, for example, a real human "expert" capable of discerning non-malicious requests from malicious ones may evaluate a subset of requests for errors in order to further expand upon known malicious and non-malicious user requests and agents/IP combinations. In one embodiment, the model generator 207 provides an efficient user interface to allow a human operator to conveniently correct and/or provide a classification for a request to aid in active learning to create additional training samples for the model generator 209 to update models.

Figure 7A:
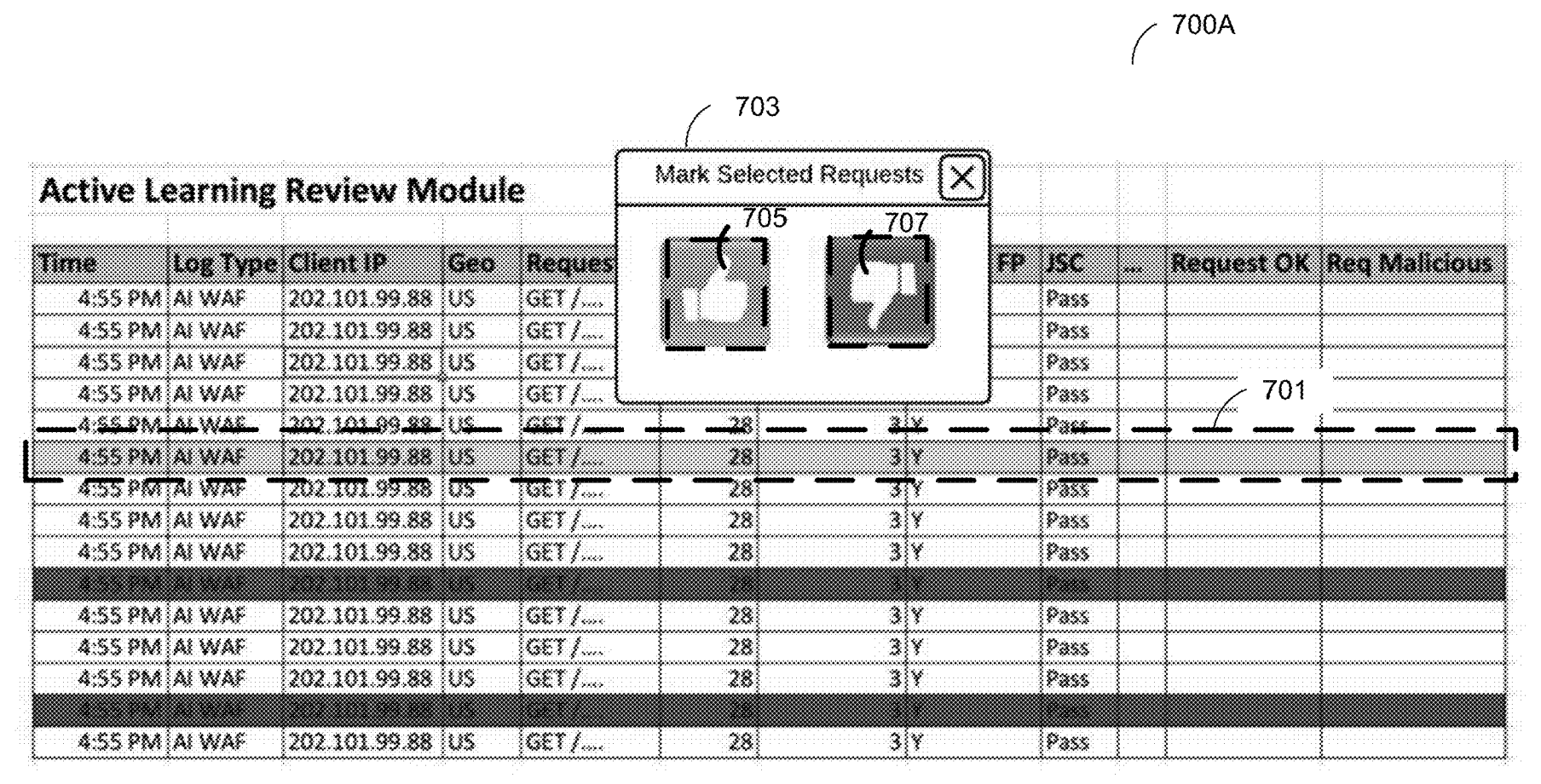

Turning to FIG. 7A, it illustrates an example interface 700A providing an overview of requests for administrator review, according to an example embodiment. In one example embodiment, the model generator 209 generates the interface. The interface 700A includes a listing of requests, which a user may select 701. In response to the selection 701 of a request, an option pane 703 for marking the selected request is generated. In turn, the user may mark the requests as non-malicious 705 or malicious 707 according to its properties in order to further supply the model generator 209 with known request samples.

Figure 7B:
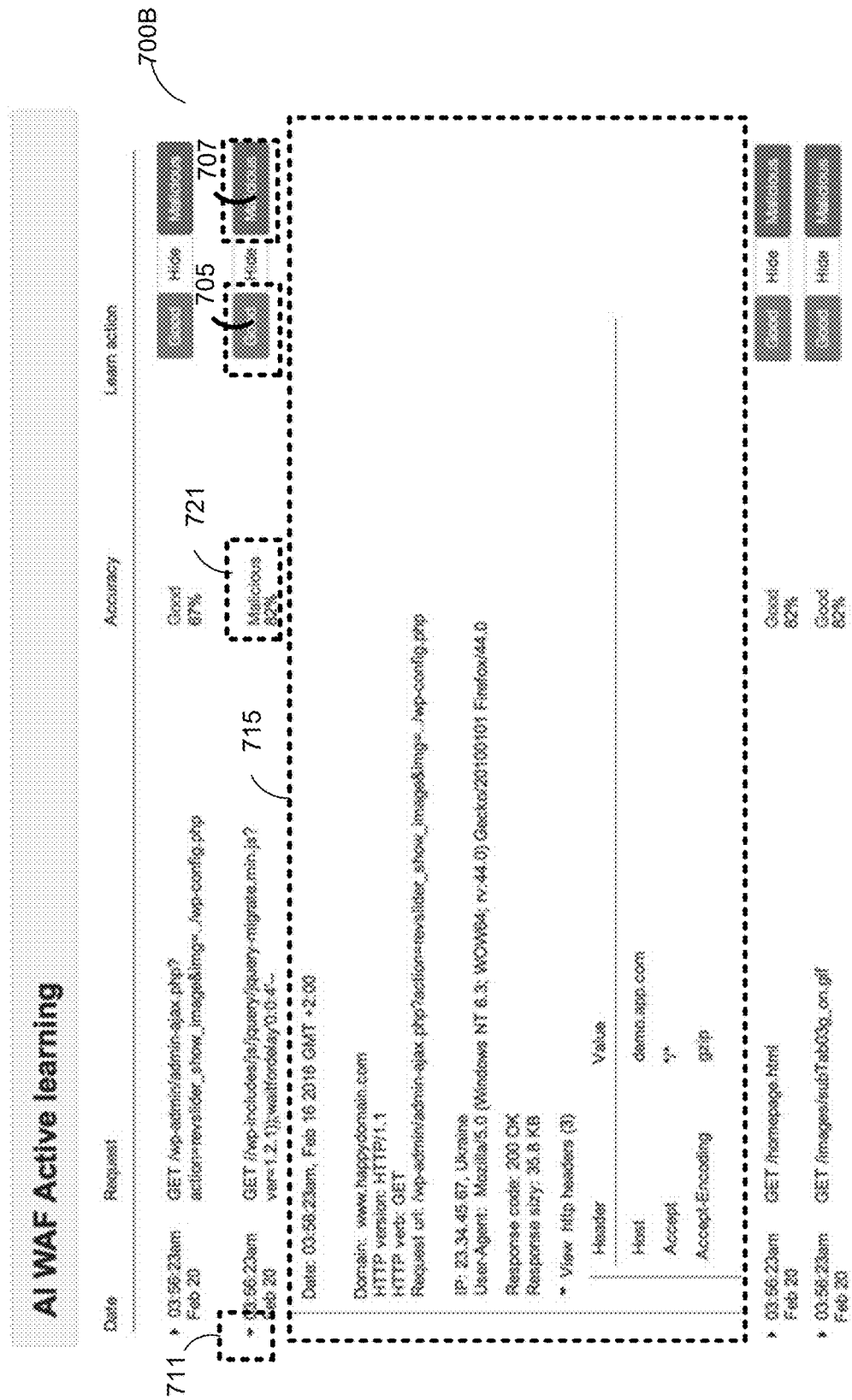

Turning to FIG. 7B, it illustrates another example interface 700B providing an overview of requests for administrator review, according to an example embodiment. In one example embodiment, the model generator 209 generates the interface. The interface 700B similarly presents a listing of requests, which a user may select 711 to drill down on the attributes 715 of a given request. In addition, the interface 700B illustrates an accuracy level 721 associated with each request to better aid the administrator in making a classification. For example, the administrator may select a non-malicious 705 or malicious 707 classification for the request based on its associated attributes.

Turning back to FIG. 3, the model generator 309 incorporates the user classified requests in the attributes database 307 as new unprocessed known malicious/non-malicious request training data for updating a model in the model database 311. For example, once enough unprocessed requests are stored in the attributes database 307, the model generator 209 may update a model in the model database 311 according the various methods describes herein. In turn, the updated model that takes into account these additional classifications may be utilized by the prediction services 327 for classifying requests.

In accordance with the example embodiments described with reference to FIGS. 2 and 3, classifications may be made in one of several places. Taken as a whole, the disclosure proposes solutions for both at-proxy classification utilizing a model and through a distributed service. Accordingly, both synchronous and asynchronous implementations are considered. In both cases, blocking occurs at a proxy 205 or proxy runtime 305, however the difference is timing. For synchronous blocking, as described with reference to FIG. 2 and proxy 205, the machine learning model developed during the training phase is executed directly on the proxy system. While FIG. 2 demonstrates the possibility of model generation 209 at the proxy 205 in addition to synchronous blocking, the model generator 209 may be implemented separately as described with FIG. 3 but the model still loaded directly to a WAF 110 at the proxy 205 for synchronous blocking. Similarly, the prediction services 327 in FIG. 3 may be incorporated at the WAFs 110 of the proxy runtimes 305 and loaded with a model from the model database 311 to provide a synchronous blocking scheme at the proxy runtimes 305. In yet other example embodiments, one or more of the features and functionality of the proxy runtimes, model generator, prediction services, discussed herein may be incorporated at a host as one or more processes. For example, one or more of the process may be incorporated as modules in a host utilizing APACHE or NGINX web servers. Under the asynchronous blocking scheme illustrated by way of example in FIG. 3, unknown request information is collected by proxy runtimes 305 and a prediction service 327 is queried for a classification. In turn, the proxy runtimes 305 may asynchronously receive request classifications. For malicious request classifications, the proxy runtime 305 may update an active block list by identifying the offending source IP address of the client to the user agent database 325 as malicious. In addition to the source IP, additional identifying information such as any device fingerprint may also be provided to more granularly identify the malicious client.

In addition, unlike traditional Web Application Firewalls which are delivered as a stand-alone server or network application that physically encompasses all of the functionality of WAF, the proposed solution enables a distributed design due to the 1) Machine Learning model training which may be separate from the proxy and/or proxy runtime and 2) Classification which may also be separator from the proxy and/or proxy runtime. Thus, a proxy may more efficiently utilize dedicated resources (CPU, Memory, Disk, and Network) for the purpose of serving real-time traffic and offloading model generating and/or request classification. At the same time, the model generator 209 when operated on a distributed server may be optimized to build and calculate the machine learning model. In an example instance, if multiple models need to be trained by the model generator 209 operations and resources can be queued such that only one model is utilizing expensive CPU and GPU resources. Likewise, the prediction services 327 when operated on a distributed server may be optimized to classify requests in response to queries from proxy. Accordingly, different or same models may be loaded in different prediction services for different web applications to classify requests for multiple web applications and/or increase classification capabilities for web applications experiencing increased traffic.

Example System Components

Figure 4:
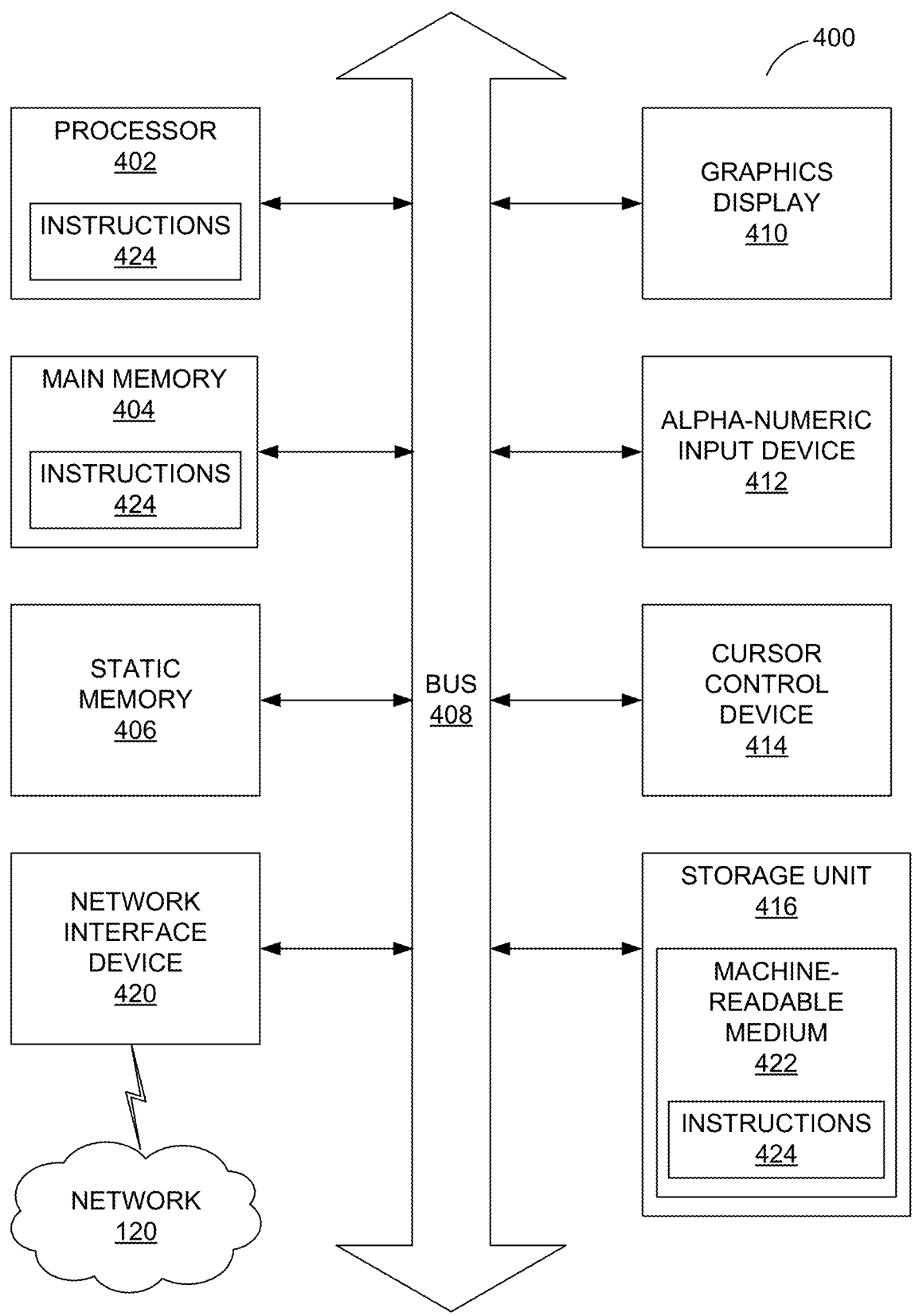
FIG. 4 illustrates an example architecture of a computing device, components of the architecture can corresponding to components in embodiments of computing devices such as clients, host, routers, and proxy.

FIG. 4 illustrates an example architecture of a computing device, components of the architecture can corresponding to components in embodiments of computing devices such as client devices, host, proxies, load balancers, log collectors, model generators, prediction services, and databases. As such, FIG. 4 illustrates components able to read instructions from a machine-readable medium and execute them on one or more processors (or controllers) to implement embodiments of the disclosed system for processing requests, generating models, and classifying requests to mitigate exploitation of web applications. For example, clients 101, 105, proxy server 205, host 145, load balancer 302 and proxy runtimes 305, log collector 309, model generator 209, prediction load balancer 315 and prediction services 327, databases 307, 311, 325, among other entities described herein may include one or more of the components illustrated in FIG. 4. Specifically, FIG. 4 shows a diagrammatic representation of a machine in the example form of a computer system 400 within which instructions 424 (e.g., software or program code) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, an internet of things (IoT) device, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or the like. The computer system 400 may also include alphanumeric input device 412 (e.g., a keyboard—hardware and/or software based), a cursor control device 414 (e.g., touch screen response, a mouse, a trackball, a joystick, a motion sensor, or other pointing instrument), a storage unit 416, and a network interface device 420, which also are configured to communicate via the bus 408.

The storage unit 416 includes a machine-readable medium 422 (e.g., a flash memory, magnetic disk) on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 120 via the network interface device 420.

In addition, it is noted that not all components illustrated and described with FIG. 4 may be necessary for some computer systems configured with program code corresponding to embodiments of the processes and functionality described within this disclosure. For example, some computer systems may include just the processor 402, the main memory 404, the storage unit 416 and the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Through use of a system, method, and computer readable storage medium storing computer program instructions for analyzing web application behavior to detect malicious client requests, web applications at a host that are accessible by a client can be protected. Thus, by implementing a proxy server or distributed proxy system that performs operators similar to those described herein the security and resilience of hosted web applications with vulnerabilities to malicious attacks can be improved. Additionally, user experience is improved through more efficient and accurate processing of traffic.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms such as the proxy or proxy runtime, attribute collector, WAF, model generator, prediction service, load balancers, log collectors, and databases etc. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 402) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIG. 1, 2, or 3 or with FIGS. 5, 6, and FIG. 7) described herein may be performed, at least partially, by one or more processors (e.g., processor 402) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 404). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system, method, and computer readable storage medium storing computer program instructions for protecting web applications at a host that are accessible by a client by analyzing web application behavior to detect malicious client requests through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method executable on a proxy server, the method for protecting a web application at a host, the method comprising:
   receiving a plurality of requests for functionality of the web application, wherein the plurality of requests include HTTP requests directed to the web application;
   identifying a set of known requests from the plurality of the requests, the set of known requests including known malicious and non-malicious requests, the remaining requests being unknown requests;
   determining attributes associated with each known request in the set of known requests, wherein determining the attributes associated with each known request comprises preprocessing each known request through a rule based Web Application Firewall;
   wherein determining the attributes from each known HTTP request includes deriving static attributes directly from the known HTTP request that are attributes including an HTTP method, an HTTP version, a uniform resource indicator, a hostname, and a request body size;
   generating a first set of request vectors including at least one vector for each known malicious request based on the static attributes of the known malicious request;
   generating a second set of request vectors including at least one vector for each known non-malicious request based on the static attributes of the known non-malicious request;
   generating a model to classify unknown requests for functionality of the web application, wherein the model is generated by at least machine learning including inputting the first set of request vectors and the second set of request vectors to train the model to identify malicious requests and non-malicious requests; and
   in response to receiving an unknown HTTP request from a client device:
      determining static attributes directly from the unknown HTTP request including at least an HTTP method, an HTTP version, a uniform resource indicator, a hostname, and a request body size;
      determining additional attributes associated with the unknown HTTP request comprising a challenge indication by:
         (i) challenging the client device that originated the unknown HTTP request; and
         (ii) setting the challenge indication based on whether the client device that originated the unknown request passed or failed the challenge;
      providing the static attributes and the additional attributes of the unknown HTTP request to the model for determining a classification for the unknown HTTP request wherein the model classifies the unknown HTTP request as malicious or non-malicious based on at least comparing the first set of request vectors and the second set of request vectors to the static attributes of the unknown HTTP request and based on the challenge indication; and
      denying or permitting a client that originated the unknown HTTP request access to the web application based on the classification.

2. The computer implemented method of claim 1, wherein identifying a set of known requests from the plurality of the requests comprises:
   receiving a list of known malicious clients and a list of known non-malicious clients selected for training the model; and
   marking the known malicious requests as malicious and the known non-malicious requests as non-malicious within the collected set of known requests.

3. The computer implemented method of claim 1, wherein determining attributes associated with each known request comprises at least one of:
   challenging a client that originated a given known request; and
   transmitting code to the client that originated the given known request for determining a device fingerprint of the client that originated the given known request.

4. The computer implemented method of claim 3, further comprising at least one of:
   determining whether the client that originated the given known request passed or failed the challenge; and
   determining whether the client that originated the given known request provided the device fingerprint.

5. The computer implemented method of claim 1, wherein determining the additional attributes associated with the unknown request further comprises:
   transmitting code to the client device that originated the unknown HTTP request for determining a device fingerprint of the client device; and
   determining whether the client device that originated the unknown HTTP request provided the device fingerprint.

6. The computer implemented method of claim 1, wherein determining attributes associated with the unknown HTTP request comprises preprocessing the unknown HTTP request through the rule based Web Application Firewall.

7. A computer implemented method executable on a proxy server, the method for protecting a web application at a host, the method comprising:
   receiving a plurality of requests for functionality of the web application, wherein the plurality of requests include HTTP requests directed to the web application;
   identifying a set of known requests from the plurality of the requests, the set of known requests including known malicious and non-malicious requests, the remaining requests being unknown requests;
   collecting the set of known requests and attributes associated with each known request in the set of known requests, wherein the attributes are determined from each known request by at least preprocessing each known request through a rule based Web Application Firewall;
   wherein collecting the attributes from each known HTTP request includes deriving static attributes directly from the known HTTP request that are attributes including an HTTP method, an HTTP version, a uniform resource indicator, a hostname, and a request body size;
   transmitting the collected set of known requests and their associated static attributes to offload generation of a model;

generating a first set of request vectors including at least one vector for each known malicious request based on the static attributes of the known malicious request;

generating a second set of request vectors including at least one vector for each known non-malicious request based on the static attributes of the known non-malicious request;

wherein the model is generated by at least machine learning including inputting the first set of request vectors and the second set of request vectors to train the model to identify malicious requests and non-malicious requests;

receiving the model configured by machine learning to classify unknown requests for functionality of the web application; and in response to receiving an HTTP unknown request in the plurality of requests and, for each unknown request:
  determining static attributes directly from the unknown HTTP request including at least an HTTP method, an HTTP version, a uniform resource indicator, a hostname, and a request body size;
  determining additional attributes associated with the unknown HTTP request comprising a challenge indication by:
    (i) challenging a client device that originated the unknown HTTP request; and
    (ii) setting the challenge indication based on whether the client device that originated the unknown request passed or failed the challenge;
  providing the static attributes and the additional attributes of the unknown HTTP request to the model for determining a classification for the unknown HTTP request wherein the model classifies the unknown HTTP request as malicious or non-malicious based on at least comparing the first set of request vectors and the second set of request vectors to the static attributes of the unknown HTTP request and based on the challenge indication; and
  denying or permitting a client that originated the unknown request access to the web application based on the classification.

8. The computer implemented method of claim 7, wherein identifying a set of known requests from the plurality of the requests comprises:
  receiving a list of known malicious clients and a list of known non-malicious clients selected for training the model; and
  marking the known malicious requests as malicious and the known non-malicious requests as non-malicious within the collected set of known requests.

9. The computer implemented method of claim 7, wherein collecting the set of known requests and attributes associated with each known request in the set of know requests comprises at least one of:
  challenging a client that originated a given known request; and
  transmitting code to the client that originated the given known request for determining a device fingerprint of the client that originated the given known request.

10. The computer implemented method of claim 9, wherein collecting attributes associated with the given known request comprises one or more of:
  determining whether the client that originated the given known request passed or failed the challenge; and
  determining whether the client that originated the given known request provided the device fingerprint.

11. The computer implemented method of claim 7, wherein collecting attributes associated with each known request comprises preprocessing each known request through a rule based Web Application Firewall.

12. The computer implemented method of claim 7, wherein determining the additional attributes associated with the unknown request further comprises:
  transmitting code to the client that originated the unknown request for determining a device fingerprint of the client; and
  determining whether the client that originated the unknown request provided the device fingerprint.

13. The computer implemented method of claim 7, wherein determining attributes associated with the unknown request comprises preprocessing the unknown request through a rule based Web Application Firewall.

14. A system for protecting a web application at a host, the system comprising
  a proxy server configured to:
    receive a plurality of requests for functionality of the web application, wherein the plurality of requests include HTTP requests directed to the web application;
    identify a set of known requests from the plurality of the requests, the set of known requests including known malicious and non-malicious requests, the remaining requests being unknown requests;
    determining attributes associated with each of the known requests comprising preprocessing each known request through a rule based Web Application Firewall;
    wherein determining the attributes from each known HTTP request includes deriving static attributes directly from the known HTTP request that are attributes including an HTTP method, an HTTP version, a uniform resource indicator, a hostname, and a request body size;
    transmit the set of known requests and their associated static attributes to offload generation of a model, and
    in response to receiving an unknown HTTP request in the plurality of requests and, for each unknown HTTP request:
      transmit a query for a classification of the unknown request, the query including attributes associated with the unknown request, wherein the attributes are determined by:
        determining static attributes directly from the unknown HTTP request including at least an HTTP method, an HTTP version, a uniform resource indicator, a hostname, and a request body size;
        determining additional attributes associated with the unknown HTTP request comprising a challenge indication by:
          (i) challenging the client device that originated the unknown HTTP request; and
          (ii) setting the challenge indication based on whether the client device that originated the unknown request passed or failed the challenge;
      in response to receiving the classification of the unknown HTTP request, denying or permitting a client that originated the unknown request access to the web application based on the classification;

a model generator configured to:
   generate a first set of request vectors including at least one vector for each known malicious request based on at least the static attributes of the known malicious request;
   generate a second set of request vectors including at least one vector for each known non-malicious request based on at least the static attributes of the known non-malicious request;
   ingest the first set of request vectors and the second set of request vectors from the set of known requests and their static attributes collected from the proxy server, and
   generate, based on the first set of request vectors and the second set of request vectors, a model to classify unknown requests for functionality of the web application, wherein the model is generated by at least machine learning including inputting the first set of request vectors and the second set of request vectors to train the model to identify malicious requests and non-malicious requests; and
a prediction service configured to:
   load the model generated by the model generator,
   receive the query for the classification of the unknown request, and
   transmit the classification for the unknown request to the proxy server, wherein the model classifies the unknown request as malicious or non-malicious based on at least comparing the first set of request vectors and the second set of request vectors to the static attributes of the unknown HTTP request and based on the challenge indication.

15. The system of claim 14, wherein identifying a set of known requests from the plurality of the requests comprises:
   receiving a list of known malicious clients and a list of known non-malicious clients selected for training the model; and
   marking the known malicious requests as malicious and the known non-malicious requests as non-malicious within the collected set of known requests.

16. The system of claim 14, the proxy server further configured to
   determine attributes associated with each known request by:
   challenging a client that originated a given known request;
   determining whether the client that originated the given known request passed or failed the challenge;
   transmitting code to the client that originated the given known request for determining a device fingerprint of the client that originated the given known request; and
   determining whether the client that originated the given known request provided the device fingerprint.

17. The system of claim 14, the proxy server further configured to
   determine attributes for the unknown request by:
   challenging the client that originated the unknown request;
   determining whether the client that originated the un known request passed or failed the challenge;
   transmitting code to the client that originated the unknown request for determining a device fingerprint of the client; and
   determining whether the client that originated the unknown request provided the device fingerprint.

18. The system of claim 14, the model generator further configured to:
   ingest a second set of known requests collected from the proxy server, and
   update the model for classifying unknown requests for functionality of the web application based on the attributes of the known requests in the first set of known requests and attributes of the known requests in the second set of known requests.

19. The system of claim 18, where the prediction service is further configured to:
   load the updated model generated by the model generator; and
   transmit a classification for a second unknown request to the proxy server, the classification determined responsive to the attributes associated with the second unknown request and the updated model.

\* \* \* \* \*